(12) United States Patent
Glatkowski

(10) Patent No.: US 7,060,241 B2
(45) Date of Patent: Jun. 13, 2006

(54) COATINGS COMPRISING CARBON NANOTUBES AND METHODS FOR FORMING SAME

(75) Inventor: Paul J. Glatkowski, Littleton, MA (US)

(73) Assignee: Eikos, Inc., Franklin, MA (US)

( * ) Notice: Subject to any disclaimer, the term of this patent is extended or adjusted under 35 U.S.C. 154(b) by 297 days.

(21) Appl. No.: 10/105,623

(22) Filed: Mar. 26, 2002

(65) Prior Publication Data
US 2003/0122111 A1 Jul. 3, 2003

Related U.S. Application Data

(60) Provisional application No. 60/311,810, filed on Aug. 14, 2001, provisional application No. 60/311,811, filed on Aug. 14, 2001, provisional application No. 60/311,815, filed on Aug. 14, 2001, provisional application No. 60/278,419, filed on Mar. 26, 2001.

(51) Int. Cl.
*D01F 9/12* (2006.01)

(52) U.S. Cl. ............... 423/447.1; 423/447.2; 428/297.4; 428/298.1; 428/299.1; 977/DIG. 1

(58) Field of Classification Search ............ 423/447.1, 423/445 R, 447.2; 428/297.4, 298.1, 299.1; 977/DIG. 1
See application file for complete search history.

(56) References Cited

U.S. PATENT DOCUMENTS

| | | | |
|---|---|---|---|
| 5,292,854 A | 3/1994 | Keller | |
| 5,424,054 A | 6/1995 | Bethune et al. | |
| 5,547,525 A | 8/1996 | Bennett et al. | |
| 5,560,898 A | 10/1996 | Uchida et al. | |
| 5,640,705 A | 6/1997 | Koruga | |
| 5,695,734 A | 12/1997 | Ikazaki et al. | |
| 5,753,088 A | 5/1998 | Olk | |
| 5,773,834 A | 6/1998 | Yamamoto et al. | |
| 5,849,830 A | 12/1998 | Tsipursky et al. | |
| 5,853,877 A * | 12/1998 | Shibuta | 478/357 |
| 5,908,585 A | 6/1999 | Shibuta | |
| 5,939,508 A | 8/1999 | Keller | |
| 5,965,202 A | 10/1999 | Taylor-Smith et al. | |
| 6,031,711 A | 2/2000 | Tennent et al. | |
| 6,038,060 A | 3/2000 | Crowley | |
| 6,099,965 A | 8/2000 | Tinnent et al. | |
| 6,124,365 A | 9/2000 | Lan et al. | |
| 6,183,714 B1 * | 2/2001 | Smalley et al. | 423/447.3 |
| 6,205,016 B1 | 3/2001 | Niu | |
| 6,250,984 B1 | 6/2001 | Jin et al. | |
| 6,265,466 B1 | 7/2001 | Glatkowski et al. | |
| 6,280,677 B1 | 8/2001 | Yakobson | |
| 6,280,697 B1 * | 8/2001 | Zhou et al. | 423/414 |
| 6,283,812 B1 | 9/2001 | Jin et al. | |
| 6,299,812 B1 | 10/2001 | Newman et al. | |
| 6,331,265 B1 * | 12/2001 | Dupire et al. | 264/289.3 |
| 6,333,016 B1 | 12/2001 | Resasco et al. | |
| 6,350,516 B1 | 2/2002 | Weber et al. | |
| 6,388,046 B1 * | 5/2002 | Campbell et al. | 528/198 |
| 6,395,199 B1 | 5/2002 | Krassowski et al. | |
| 6,426,134 B1 | 7/2002 | Lavin et al. | |
| 2002/0161101 A1 * | 10/2002 | Carroll et al. | 524/495 |
| 2002/0176650 A1 * | 11/2002 | Zhao et al. | 385/16 |
| 2004/0265550 A1 * | 12/2004 | Glatkowski et al. | 428/209 |

FOREIGN PATENT DOCUMENTS

| | | |
|---|---|---|
| EP | 0 949 199 A1 | 10/1999 |
| JP | 64-22982 | 1/1989 |
| JP | 09-115334 | 5/1997 |
| JP | 2000-026760 | 1/2000 |
| JP | 2000-203821 | 7/2000 |
| JP | 2001-011344 | 1/2001 |
| JP | 2001-030200 | 2/2001 |
| JP | 2003-500325 | 7/2003 |
| JP | H03-116929 | 4/2004 |
| JP | S60-41235 | 4/2004 |
| WO | WO 99/65821 | 12/1999 |
| WO | WO 00/51936 | 9/2000 |
| WO | WO 00/73204 A1 | 12/2000 |
| WO | WO 01/92381 | 12/2001 |

OTHER PUBLICATIONS

Merriam-Webster Online Dictionary—Definition of "orient".*
Park et al. "Dispersion of single wall carbon nanotubes by in situ polymerization under sonication", Oct. 4, 2002, Chemical Physics Letters, vol. 364, pp. 303-308.*
Wu et al."Transparent, Conductive Carbon Nanotubes Films", Aug. 27, 2004, Science, vol. 305, pp. 1273-1276.*
Peter Fairley, "*Nanotechnology: The Start of Something Big,*" Chemicalweek pp. 23-26 (Dec. 12, 2001).
Pulickel M. Ajayan, "*Aligned Carbon Nanotubes in a Thin Polymer Film,*" Advanced Materials, vol. 7, No. 5, pp. 489-491 (1995).
J. Sandler et al., "*Development of a Dispersion Process for Carbon Nanotubes in an Epoxy Matrix and the Resulting Electrical Properties,*" Polymer 40, pp. 5967-5971 (1999).
Kevin Ausman et al., "Organic Solvent Dispersions of Single-Walled Carbon Nanotubes: Toward Solutions of Pristine Nanotubes," *Journal of Physical Chemistry*, vol. 104, No. 38, pp. 8911-8915 (Sep. 28, 2000).
Philip Ball, "*Through the Nanotube,*" New Scientist, pp. 28-31 (Jul. 6, 1996).

*Primary Examiner*—Stanley S. Silverman
*Assistant Examiner*—Peter J. Lish
(74) *Attorney, Agent, or Firm*—Powell Goldstein LLP

(57) ABSTRACT

An electrically conductive film is disclosed. According to one embodiment of the present invention, the film includes a plurality of single-walled nanotubes having a particular diameter. The disclosed film demonstrates excellent conductivity and transparency. Methods of preparing the film as well as methods of its use are also disclosed herein.

107 Claims, 5 Drawing Sheets

OTHER PUBLICATIONS

B.I. Yakobson et al., "*Fullerene Nanotubes: $C_{1,000,000}$ and Beyond*," American Scientist, vol. 85, pp. 324-337 (Jul.-Aug. 1997).

P.M. Ajayan et al., "*Nanometre-size tubes of carbon*," Rep. Prog. Phys., vol. 60, pp. 1025-1062 (1997).

\* cited by examiner

COATINGS COMPRISING CARBON NANOTUBES AND METHODS FOR FORMING SAME

REFERENCE TO RELATED APPLICATIONS

This application claims priority to U.S. Provisional Application No. 60/278,419 entitled "Electrodissipative Transparent Coatings Comprising Single-Wall Nanotubes and Methods for Forming Same" filed Mar. 26, 2001, U.S. Provisional Application No. 60/311,810 entitled "EMI IR Materials" filed Aug. 14, 2001, U.S. Provisional Application No. 60/311,811 entitled "Biodegradable Film" filed Aug. 14, 2001, and U.S. Provisional Application No. 60/311,815 entitled "EMI Optical Materials" filed Aug. 14, 2001, each of which is entirely and specifically incorporated by reference.

RIGHTS IN THE APPLICATION

This invention was made, in part, with support from the United States Government under Contract No. F33615-99/C-5006 from the United States Air Force, and Contract No. NAS1-0146 from the United States National Aeronautics and Space Administration, and, accordingly, the United States may have certain rights in this invention.

BACKGROUND OF THE INVENTION

1. Field of the Invention

The present invention relates electrically conductive coatings. More particularly, the invention relates to transparent electrically conductive coatings comprising carbon nanotubes.

2. Description of the Related Art

Electrically conductive transparent films are known in the art. In general, such films are generally formed on an electrical insulating substrate by either a dry or a wet process. In the dry process, PVD (including sputtering, ion plating and vacuum deposition) or CVD is used to form a conductive transparent film of a metal oxide type, e.g., tin-indium mixed oxide (ITO), antimony-tin mixed oxide (ATO), fluorine-doped tin oxide (FTO), aluminum-doped zinc oxide (FZO). In the wet process, a conductive coating composition is formed using an electrically conductive powder, e.g., one of the above-described mixed oxides and a binder. The dry process produces a film having both good transparency and good conductivity. However, it requires a complicated apparatus having a vacuum system and has poor productivity. Another problem of the dry process is that it is difficult to apply to a continuous or big substrate such as photographic films or show windows.

The wet process requires a relatively simple apparatus, has high productivity, and is easy to apply to a continuous or big substrate. The electrically conductive powder used in the wet process is a very fine powder having an average primary particle diameter of 0.5 μm or less so as not to interfere with transparency of the resulting film. To obtain a transparent coating film, the conductive powder has an average primary particle diameter of half or less (0.2 μm) of the shortest wave of visible light so as not to absorb visible light, and to controlling scattering of the visible light.

The development of intrinsically conductive organic polymers and plastics has been ongoing since the late 1970's. These efforts have yielded conductive materials based on polymers such as polyanaline, polythiophene, polypyrrole, and polyacetylene. (See "*Electrical Conductivity in Conjugated Polymers.*" Conductive Polymers and Plastics in Industrial Applications", Arthur E. Epstein; "*Conductive Polymers.*" Ease of Processing Spearheads Commercial Success. Report from Technical Insights. Frost & Sullivan; and "*From Conductive Polymers to Organic Metals.*" Chemical Innovation, Bernhard Wessling.

A significant discovery was that of carbon nanotubes, which are essentially single graphite layers wrapped into tubes, either single walled nanotubes (SWNTs) or double walled (DWNTs) or multi walled (MWNTs) wrapped in several concentric layers. (B. I. Yakobson and R. E. Smalley, "Fullerene Nanotubes: $C_{1,000,000}$ and Beyond", *American Scientist* v.85, July-August 1997). Although only first widely reported in 1991, (Phillip Ball, "Through the Nanotube", *New Scientist*, Jul. 6, 1996, p. 28–31.) carbon nanotubes are now readily synthesized in gram quantities in the laboratories all over the world, and are also being offered commercially. The tubes have good intrinsic electrical conductivity and have been used in conductive materials.

U.S. Pat. No. 5,853,877, the disclosure of which is incorporated by reference in its entirety, relates to the use of chemically-modified multiwalled nanotubes (MWNT). The coating and films disclosed in U.S. Pat. No. 5,853,877 are optically transparent when formed as a very thin layer. As the thickness of the films increases to greater than about 5 μm, the films lose their optical properties.

U.S. Pat. No. 5,853,877 also relates to films that are formed with and without binders. The films include binders with a very high nanotube concentration and are extremely thin in order to maintain the optical properties. For example, the patent discloses a film with 40% wt MWNT loading to get good ESD conductivities.

U.S. Pat. No. 5,908,585, the disclosure of which is incorporated by reference in its entirety, relates the use of two conductive additives, both MWNT and an electrically conductive metal oxide powder.

SUMMARY OF THE INVENTION

Therefore, a need has arisen for an electrically conductive film comprising nanotubes with a particular diameter that overcome those drawbacks of the related art.

Accordingly, in a preferred embodiment, the invention provides electrostatic dissipative transparent coatings comprising nanotubes.

Accordingly, in another preferred embodiment, the invention provides an electrically conductive film comprising: a plurality of nanotubes with an outer diameter of less than 3.5 nm.

In another preferred embodiment, the invention provides a method for making an electrically conductive film of claim 1 comprising: providing a plurality of nanotubes with an outer diameter of less than 3.5 nm; and forming a film of said nanotubes on a surface of a substrate.

In another preferred embodiment, the invention provides a multi-layered structure comprising: an electrically conductive film, and a polymeric layer disposed on at least a portion of said electrically conductive film.

In another preferred embodiment, the invention provides dispersions of nanotubes suitable for forming films and other compositions. Such compositions may contain additional conductive, partially conductive or non-conductive materials. The presence of nanotubes reduces the manufacturing costs of conventional materials that do not contain nanotubes while increasing product effectiveness, preferably product conductivity. Compositions may be in any form such as a solid or liquid, and is preferably a powder, a film, a coating, an emulsion, or mixed dispersion.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention. Thus, for a more complete understanding of the present invention, the objects and advantages thereof, reference is now made to the following descriptions taken in connection with the accompanying drawings in which.

DETAILED DESCRIPTION OF THE INVENTION

Figure 1:
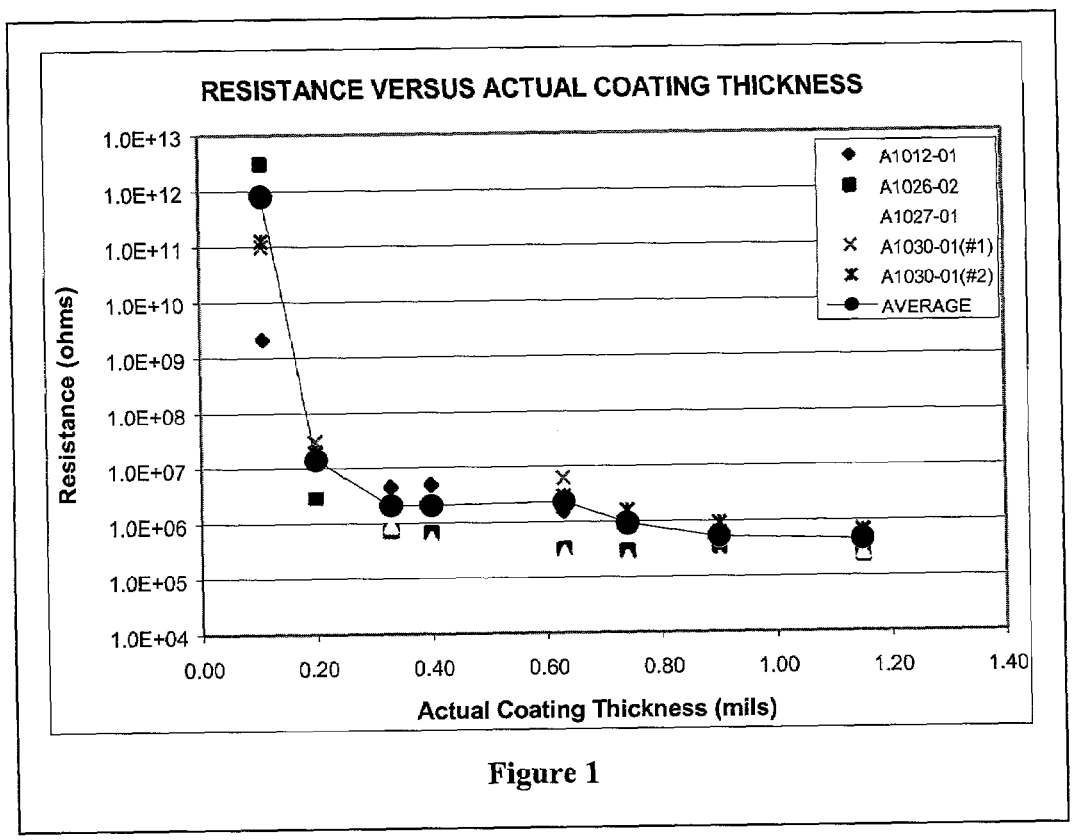
FIG. 1 is a plot of conductivity verses thickness for SWNT coatings according to one embodiment of the present invention.

The preferred embodiments of the present invention and its advantages are understood by referring to the Figures of the drawings, wherein like numerals being used for like and corresponding parts of the various drawings.

The instant invention relates to particular electrically conductive films comprising nanotubes and methods of forming the same. The instant films comprising nanotubes demonstrate advantageous light transmissions over those materials comprising nanotubules disclosed heretofore. In this connection the instant invention relies on nanotubes with a particular diameter which impart surprising advantages over those films disclosed in the prior art.

In relation to the above, it has surprisingly been found that nanotubes with an outer diameter of less than 3.5 nm are particularly good candidates to impart conductivity and transparency at low loading doses. These nanotubes can exhibit electrical conductivity as high as copper, thermal conductivity as high as diamond, strength 100 times greater than steel at one sixth the weight, and high strain to failure. However, heretofore, there has been no report of such nanotubes in an electrically conductive and transparent film.

Nanotubes are known and have a conventional meaning. (R. Saito, G. Dresselhaus, M. S. Dresselhaus, "Physical Properties of Carbon Nanotubes," Imperial College Press, London U.K. 1998, or A. Zettl "Non-Carbon Nanotubes" Advanced Materials, 8, p. 443 (1996)).

In a preferred embodiment, nanotubes of this invention comprises straight and bent multi-walled nanotubes (MWNTs), straight and bent double-walled nanotubes (DWNTs) and straight and bent single-walled nanotubes (SWNTs), and various compositions of these nanotube forms and common by-products contained in nanotube preparations such as described in U.S. Pat. No. 6,333,016 and WO 01/92381, which are incorporated herein by reference in their entirety.

The nanotubes of the instant invention have an outer diameter of less than 3.5 nm. In another preferred embodiment, nanotubes of the instant invention have an outer diameter of less than 3.25 nm. In another preferred embodiment, nanotubes of the instant invention have an outer diameter of less than 3.0 nm. In another preferred embodiment, the nanotubes have an outer diameter of about 0.5 to about 2.5 nm. In another preferred embodiment, the nanotubes have an outer diameter of about 0.5 to about 2.0 nm. In another preferred embodiment, the nanotubes have an outer diameter of about 0.5 to about 1.5 nm. In another preferred embodiment, the nanotubes have an outer diameter of about 0.5 to about 1.0 nm. The aspect ratio may be between 10 and 2000.

In a preferred embodiment, the nanotubes comprise single walled carbon-based SWNT-containing material. SWNTs can be formed by a number of techniques, such as laser ablation of a carbon target, decomposing a hydrocarbon, and setting up an arc between two graphite electrodes. For example, U.S. Pat. No. 5,424,054 to Bethune et al. describes a process for producing single-walled carbon nanotubes by contacting carbon vapor with cobalt catalyst. The carbon vapor is produced by electric arc heating of solid carbon, which can be amorphous carbon, graphite, activated or decolorizing carbon or mixtures thereof. Other techniques of carbon heating are discussed, for instance laser heating, electron beam heating and RF induction heating. Smalley (Guo, T., Nikoleev, P., Thess, A., Colbert, D. T., and Smally, R. E., Chem. Phys. Lett. 243: 1–12 (1995)) describes a method of producing single-walled carbon nanotubes wherein graphite rods and a transition metal are simultaneously vaporized by a high-temperature laser. Smalley (Thess, A., Lee, R., Nikolaev, P., Dai, H., Petit, P., Robert, J., Xu, C., Lee, Y. H., Kim, S. G., Rinzler, A. G., Colbert, D.

T., Scuseria, G. E., Tonarek, D., Fischer, J. E., and Smalley, R. E., Science, 273: 483–487 (1996)) also describes a process for production of single-walled carbon nanotubes in which a graphite rod containing a small amount of transition metal is laser vaporized in an oven at about 1200° C. Single-wall nanotubes were reported to be produced in yields of more than 70%. U.S. Pat. No. 6,221,330, which is incorporated herein by reference in its entirety, discloses methods of producing single-walled carbon nanotubes which employs gaseous carbon feedstocks and unsupported catalysts.

SWNTs are very flexible and naturally aggregate to form ropes of tubes. The formation of SWNT ropes in the coating or film allows the conductivity to be very high, while loading is very low, and results in a good transparency and low haze.

The instant films provide excellent conductivity and transparency at low loading of nanotubes. In a preferred embodiment, the nanotubes are present in the film at about 0.001 to about 1% based on weight. Preferably, the nanotubes are present in said film at about 0.01 to about 0.1%, which results in a good transparency and low haze.

The instant films are useful in a variety of applications for transparent conductive coatings such as ESD protection, EMI/RFI shielding, low observability, polymer electronics (e.g., transparent conductor layers for OLED displays, EL lamps, plastic chips, etc.). The surface resistance of the instant films can easily be adjusted to adapt the films to these applications that have different target ranges for electrical conductivity. For example, it is generally accepted that the resistance target range for ESD protection is $10^6$–$10^{10}$ ohms/square. It is also generally accepted that a resistance for conductive coatings for EMI/RFI shielding should be $<10^4$ ohms/square. It is also generally accepted that low observability coatings for transparencies is typically $<10^3$ ohms/square, preferably $<10^2$ ohms/square. For polymer electronics, and inherently conductive polymers (ICPs), the resistivity values typically are $<10^4$ ohms/square.

Accordingly, in a preferred embodiment, the film has a surface resistance in the range of less than about $10^{10}$ ohms/square. Preferably, the film has a surface resistance in the range of about $10^0$–$10^{10}$ ohms/square. Preferably, the film has a surface resistance in the range of about $10^1$–$10^4$ ohms/square. Preferably, the film has a surface resistance in the range of less than about $10^3$ ohms/square. Preferably, the film has a surface resistance in the range of less than about $10^2$ ohms/square. Preferably, the film has a surface resistance in the range of about $10^{-2}$–$10^0$ ohms/square.

The instant films also have volume resistances in the range of about $10^{-2}$ ohms-cm to about $10^{10}$ ohms-cm. The volume resistances are as defined in ASTM D4496-87 and ASTM D257-99.

The instant films demonstrate excellent transparency and low haze. For example, the instant film has a total transmittance of at least about 60% and a haze value of visible light of about 2.0% or less. In a preferred embodiment, the instant films have a haze value of 0.5% or less.

In a preferred embodiment, the film has a total light transmittance of about 80% or more. In another preferred embodiment, the film has a total light transmittance of about 85% or more. In another preferred embodiment, the film has a total light transmittance of about 90% or more. In another preferred embodiment, the film has a total light transmittance of about 95% or more. In another preferred embodiment, has a haze value less than 1%. In another preferred embodiment, film has a haze value less than 0.5%.

Total light transmittance refers to the percentage of energy in the electromagnetic spectrum with wavelengths less than $1\times10^{-2}$ cm that passes through the films, thus necessarily including wavelengths of visible light.

The instant films range from moderately thick to very thin. For example, the films can have a thickness between about 0.5 nm to about 1000 microns. In a preferred embodiment, the films can have a thickness between about 0.005 to about 1000 microns. In another preferred embodiment, the film has a thickness between about 0.05 to about 500 microns. In another preferred embodiment, the film has a thickness between about 0.05 to about 500 microns. In another preferred embodiment, the film has a thickness between about 0.05 to about 400 microns. In another preferred embodiment, the film has a thickness between about 1.0 to about 300 microns. In another preferred embodiment, the film has a thickness between about 1.0 to about 200 microns. In another preferred embodiment, the film has a thickness between about 1.0 to about 100 microns. In another preferred embodiment, the film has a thickness between about 1.0 to about 50 microns.

In another preferred embodiment, the film further comprises a polymeric material. The polymeric material may be selected from a wide range of natural or synthetic polymeric resins. The particular polymer may be chosen in accordance with the strength, structure, or design needs of a desired application. In a preferred embodiment, the polymeric material comprises a material selected from the group consisting of thermoplastics, thermosetting polymers, elastomers and combinations thereof. In another preferred embodiment, the polymeric material comprises a material selected from the group consisting of polyethylene, polypropylene, polyvinyl chloride, styrenic, polyurethane, polyimide, polycarbonate, polyethylene terephthalate, cellulose, gelatin, chitin, polypeptides, polysaccharides, polynucleotides and mixtures thereof. In another preferred embodiment, the polymeric material comprises a material selected from the group consisting of ceramic hybrid polymers, phosphine oxides and chalcogenides.

Films of this invention may be easily formed and applied to a substrate such as a dispersion of nanotubes alone in solvents such as acetone, water, ethers, and alcohols. The solvent may be removed by normal processes such as air drying, heating or reduced pressure to form the desired film of nanotubes. The films may be applied by other known processes such as spray painting, dip coating, spin coating, knife coating, kiss coating, gravure coating, screen printing, ink jet printing, pad printing, other types of printing or roll coating.

A dispersion is a composition comprising preferably, but not limited to, a uniform or non-uniform distribution of two or more heterogeneous materials. Those materials may or may not chemically interact with each other or other components of the dispersion or be totally or partially inert to components of the dispersion. Heterogeneity may be reflected in the chemical composition, or in the form or size of the materials of the dispersion.

The instant films may be in a number and variety of different forms including, but not limited to, a solid film, a partial film, a foam, a gel, a semi-solid, a powder, or a fluid. Films may exist as one or more layers of materials of any thickness and three-dimensional size.

The substrate is not critical and can be any conductive or non-conductive material, for example, metals, organic polymers, inorganic polymers, glasses, crystals, etc. The substrate for example, maybe, transparent, semi-transparent, or opaque. For example, the substrate may be a woven carbon or glass fabric to form a prepreg (resin coated fabric) wherein the instant conductive films enhance visual quality inspection of the prepreg. Alternatively, the substrate may be an electronic enclosure with a conductive film to render the surface conductive without significantly changing the appearance of the enclosure.

The instant films comprising nanotubes in a proper amount mixed with a polymer can be easily synthesized. At most a few routine parametric variation tests may be required to optimize amounts for a desired purpose. Appropriate processing control for achieving a desired array of nanotubes with respect to the plastic material can be achieved using conventional mixing and processing methodology, including but not limited to, conventional extrusion, multi-dye extrusion, press lamination, etc. methods or other techniques applicable to incorporation of nanotubes into a polymer.

The nanotubes may be dispersed substantially homogeneously throughout the polymeric material but can also be present in gradient fashion, increasing or decreasing in amount (e.g. concentration) from the external surface toward the middle of the material or from one surface to another, etc. Alternatively, the nanotubes can be dispersed as an external skin or internal layer thus forming interlaminate structures.

In a preferred embodiment, the instant nanotube films can themselves be over-coated with a polymeric material. In this way, the invention contemplates, in a preferred embodiment, novel laminates or multi-layered structures comprising films of nanotubes over coated with another coating of an inorganic or organic polymeric material. These laminates can be easily formed based on the foregoing procedures and are highly effective for distributing or transporting electrical charge. The layers, for example, may be conductive, such as tin-indium mixed oxide (ITO), antimony-tin mixed oxide (ATO), fluorine-doped tin oxide (FTO), aluminum-doped zinc oxide (FZO) layer, or provide UV absorbance, such as a zinc oxide (ZnO) layer, or a doped oxide layer, or a hard coat such as a silicon coat. In this way, each layer may provide a separate characteristic.

In a preferred embodiment, the multi-layered structures have alternating layers of nanotube-containing and non-nanotube containing layers.

In a preferred embodiment, the nanotubes are oriented by exposing the films to a shearing, stretching, or elongating step or the like, e.g., using conventional polymer processing methodology. Such shearing-type processing refers to the use of force to induce flow or shear into the film, forcing a spacing, alignment, reorientation, disentangling etc. of the nanotubes from each other greater than that achieved for nanotubes simply formulated either by themselves or in admixture with polymeric materials. Oriented nanotubes are discussed, for example in U.S. Pat. No. 6,265,466, which is incorporated herein by reference in its entirety. Such disentanglement etc. can be achieved by extrusion techniques, application of pressure more or less parallel to a surface of the composite, or application and differential force to different surfaces thereof, e.g., by shearing treatment by pulling of an extruded plaque at a variable but controlled rate to control the amount of shear and elongation applied to the extruded plaque. It is believed that this orientation results in superior properties of the film, e.g., enhanced electromagnetic (EM) shielding.

Oriented refers to the axial direction of the nanotubes. The tubes can either be randomly oriented, orthoganoly oriented (nanotube arrays), or preferably, the nanotubes are oriented in the plane of the film.

In a preferred embodiment, the invention contemplates a plurality of differentially-oriented nanotube film layers wherein each layer can be oriented and adjusted, thus forming filters or polarizers.

In a preferred embodiment, the invention also provides dispersions comprising nanotubes. Preferably, the nanotubes have an outer diameter less than 3.5 nm. The instant dispersions are suitable for forming films as described herein. Accordingly, the instant dispersions may optionally further comprise a polymeric material as described herein. The instant dispersions may optionally further comprise an agent such as a plasticizer, softening agent, filler, reinforcing agent, processing aid, stabilizer, antioxidant, dispersing agent, binder, a cross-linking agent, a coloring agent, a UV absorbent agent, or a charge adjusting agent.

Dispersions of the invention may further comprise additional conductive organic materials, inorganic materials or combinations or mixtures of such materials. The conductive organic materials may comprise particles containing buckeyballs, carbon black, fullerenes, nanotubes with an outer diameter of greater than about 3.5 nm, and combinations and mixtures thereof. Conductive inorganic materials may comprise particles of aluminum, antimony, beryllium, cadmium, chromium, cobalt, copper, doped metal oxides, iron, gold, lead, manganese, magnesium, mercury, metal oxides, nickel, platinum, silver, steel, titanium, zinc, or combinations or mixtures thereof. Preferred conductive materials include tin-indium mixed oxide, antimony-tin mixed oxide, fluorine-doped tin oxide, aluminum-doped zinc oxide and combinations and mixtures thereof. Preferred dispersion may also contain fluids, gelatins, ionic compounds, semiconductors, solids, surfactants, and combinations and mixtures thereof.

The present invention, thus generally described, will be understood more readily by reference to the following examples, which are provided by way of illustration and are not intended to be limiting of the present invention.

EXAMPLES

Comparison of Electrical Properties for MWNT (Hyperion and Carbolex) and SWNT (CNI (Laser Ablated and HiPCO))

The nanotubes in Table 1 were sonicated for eight minutes into Titanium SI-DETA (ceramer hybrid resin, this work has been repeated for other resin systems like epoxy and urethane) and then cast onto a glass or polycarbonate slide. A set of Hyperion MWNT was sonicated in toluene then rinsed in IPA and added to the Titanium SI-DETA were it was sonicated for another 4 minutes. The thickness of the cast films is 0.5 mils thick.

TABLE 1

| Wt. % Nanotubes Dry wt. | Hyperion MWnT | % T | Hyperion MWnT Toluene Extracted | % T Toluene Extracted | Bucky USA MWnT* | % T | CNI SWnT | % T |
|---|---|---|---|---|---|---|---|---|
| 0.04 | | | | | | | 2.2E+9 | 84.5 |
| 0.06 | | | | | | | 3.5E+7 | 73.5 |
| 0.08 | | | | | | | 3.5E+7 | 76.2 |
| 0.10 | >1.0E+11 | 92 | >1.0E+11 | 85.5 | >1.0E+11 | 94.4 | 4.5E+7 | 80.2 |
| 0.20 | >1.0E+11 | 88.1 | >1.0E+11 | 77.4 | >1.0E+11 | 94.2 | 1.0E+7 | 70.0 |
| 0.30 | >1.0E+11 | 88.7 | >1.0E+11 | 74.1 | >1.0E+11 | 93.1 | 7.5E+6 | 59.4 |
| 0.40 | >1.0E+11 | 85.7 | | | >1.0E+11 | 92.5 | 1.7E+6 | 54.8 |
| 0.50 | >1.0E+11 | 82.2 | >1.0E+11 | 63.4 | >1.0E+11 | 92 | | |
| 1.00 | >1.0E+11 | 68.5 | 3.5E+9 | 37.5 | >1.0E+11 | 84.7 | | |
| 2.00 | >1.0E+11 | 46.9 | 6.0E+6 | 15.2 | >1.0E+11 | 81.5 | | |
| 3.00 | >1.0E+11 | 41.6 | 3.25E+6 | 5.4 | >1.0E+11 | 79.8 | | |

As discussed above, U.S. Pat. No. 5,908,585 discloses a film having two conductive additives. In this table they did not create a film with high enough conductivity to qualify as an ESD films (<10E10 Ohms/sq). Only when they add a substantial (>20%) loading of conductive metal oxide does the films function as claimed. All claims are founded on this use of both fillers.

Optical Properties, Transmission, Color and Haze for Three Coatings. 0.1%, 0.2%, and 0.3% SWNT in Ceramer Coating

TABLE 2

Haze Test Results for Si-DETA-50-Ti coatings on glass at 18 um thickness

| Sample Name | Number | Thickness inches | Haze % | Total Luminous Transmittance (%) | Diffuse Trans % |
|---|---|---|---|---|---|
| Blank | 1 | 0.044 | 0.1 | 92.0 | 0.1 |
| | 2 | 0.044 | 0.1 | 92.0 | 0.1 |
| | 3 | 0.044 | 0.1 | 92.0 | 0.1 |
| | Average | | 0.1 | 92.0 | 0.1 |
| 0.1% SWNT | 1 | 0.044 | 3.2 | 85.2 | 3.8 |
| | 2 | 0.044 | 3 | 85.0 | 3.5 |
| | 3 | 0.044 | 3 | 85.2 | 3.5 |
| | Average | | 3.1 | 85.1 | 3.6 |
| 0.2% SWNT | 1 | 0.044 | 3.8 | 81.9 | 4.6 |
| | 2 | 0.044 | 4.3 | 81.3 | 5.3 |
| | 3 | 0.044 | 3.7 | 81.9 | 4.5 |
| | Average | | 3.9 | 81.7 | 4.8 |
| 0.3% SWNT | 1 | 0.044 | 5.7 | 76.8 | 7.4 |
| | 2 | 0.044 | 5.5 | 77.3 | 7.1 |
| | 3 | 0.044 | 5.6 | 76.9 | 7.3 |
| | Average | | 5.6 | 77.0 | 7.3 |

| | Color Scale XYZ | | 1 | 2 | 3 | AVE |
|---|---|---|---|---|---|---|
| BLANK | C2 | X | 90.18 | 90.19 | 90.18 | 90.18 |
| | | Y | 91.99 | 92.00 | 91.99 | 91.99 |
| | | Z | 108.52 | 108.53 | 108.52 | 108.52 |
| | F2 2 | X | 16.18 | 16.18 | 16.18 | 16.18 |
| | | Y | 26.98 | 26.99 | 26.99 | 26.99 |
| | | Z | 124.83 | 124.84 | 124.83 | 124.83 |
| | A 2 | X | 101.05 | 101.06 | 101.05 | 101.05 |
| | | Y | 91.99 | 92.00 | 92.00 | 92.00 |
| | | Z | 32.67 | 32.67 | 32.67 | 32.67 |
| 0.1% SWNT | C2 | X | 83.31 | 83.13 | 83.23 | 83.22 |
| | | Y | 85.23 | 85.04 | 85.15 | 85.14 |
| | | Z | 97.89 | 97.75 | 97.76 | 97.80 |
| | F2 2 | X | 15.01 | 14.97 | 14.99 | 14.99 |
| | | Y | 25.18 | 25.12 | 25.16 | 25.15 |
| | | Z | 115.77 | 115.50 | 115.65 | 115.64 |
| | A 2 | X | 93.87 | 93.65 | 93.78 | 93.77 |
| | | Y | 85.38 | 85.18 | 85.30 | 85.29 |
| | | Z | 29.57 | 29.52 | 29.53 | 29.54 |
| 0.2% SWNT | C2 | X | 80.21 | 79.55 | 80.17 | 79.98 |
| | | Y | 81.93 | 81.25 | 81.89 | 81.69 |
| | | Z | 95.01 | 94.15 | 94.96 | 94.71 |
| | F2 2 | X | 14.43 | 14.30 | 14.42 | 14.38 |
| | | Y | 24.19 | 23.99 | 24.18 | 24.12 |
| | | Z | 111.26 | 110.32 | 111.20 | 110.93 |
| | A 2 | X | 90.20 | 89.46 | 90.15 | 89.94 |
| | | Y | 82.04 | 81.37 | 82.00 | 81.80 |
| | | Z | 38.65 | 28.40 | 28.64 | 31.90 |
| 0.3% SWNT | C2 | X | 75.13 | 75.65 | 75.24 | 75.34 |
| | | Y | 76.78 | 77.32 | 76.90 | 77.00 |
| | | Z | 88.29 | 88.96 | 88.42 | 88.56 |
| | F2 2 | X | 13.53 | 13.62 | 13.55 | 13.57 |
| | | Y | 22.74 | 22.88 | 22.77 | 22.80 |
| | | Z | 104.30 | 105.02 | 104.46 | 104.59 |
| | A 2 | X | 84.63 | 85.20 | 84.74 | 84.86 |
| | | Y | 76.94 | 77.47 | 77.06 | 77.16 |
| | | Z | 26.65 | 26.85 | 26.69 | 26.73 |

Referring to FIG. 1, a plot of conductivity verses thickness for SWNT coatings is provided. Note that new HiPCO CNI nanotubes provide lower resistance.

Conductivity Verses Humidity for SWNT Coatings

Figure 2:
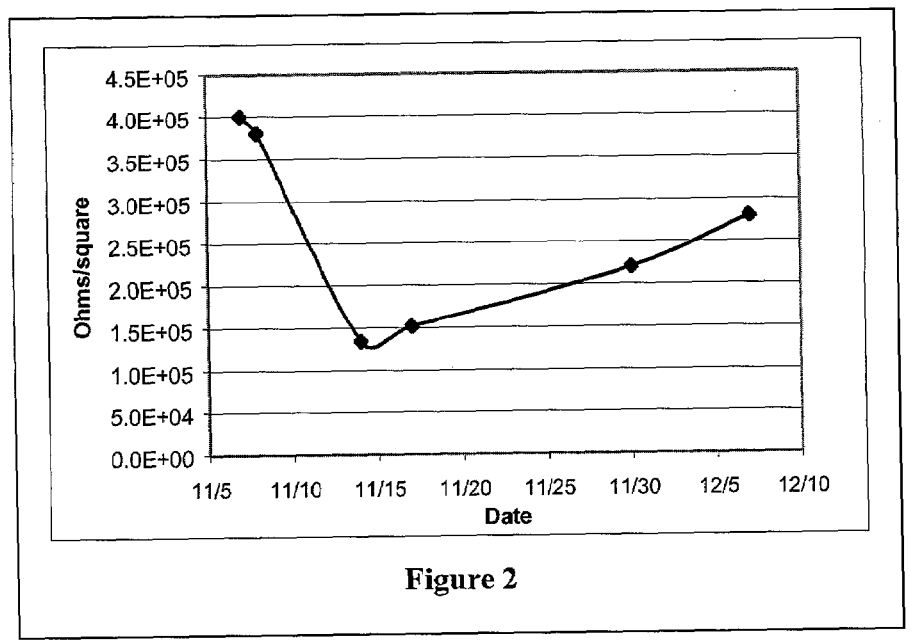
FIG. 2 depicts a plot of the affect of high humidity on an ESD coating over an extended period of time according to one embodiment of the present invention.

Referring to Table 3 and FIG. 2, humidity does not affect the electrical conductivity of the SWNT/Si-DETA coating. FIG. 2 shows the affect of high humidity over an extended period of time.

The resistance was unchanged over a month at saturated conditions.

TABLE 3

| Date | Temperature | Percent Humidity | Ohms/Square |
|---|---|---|---|
| Nov. 4, 2000 | 23 | 40 | 1.2E+5 |
| Nov. 6, 2000 | 23 | 6 | 1.38E+5 |
| Nov. 7, 2000 | 23 | 98 | 4.0E+5 |
| Nov. 8, 2000 | 23 | 98 | 3.8E+5 |
| Nov. 14, 2000 | 23 | 98 | 1.35E+5 |
| Nov. 17, 2000 | 23 | 98 | 1.52E+5 |
| Nov. 30, 2000 | 22 | 98 | 2.2E+5 |
| Dec. 7, 2000 | 21 | 98 | 2.8E+5 |

Figure 3:
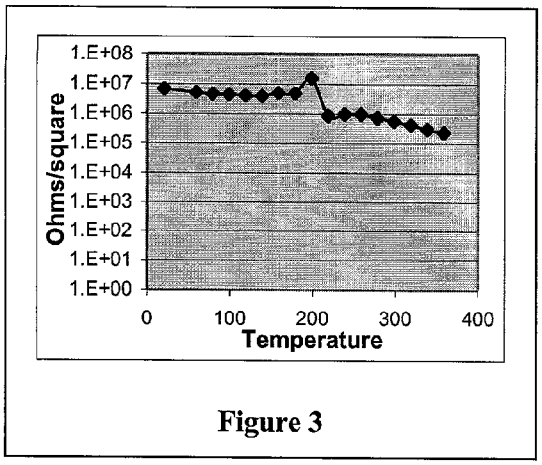
FIG. 3 depicts a plot of surface resistivity versus temperature data for Si-DETA-50-Ti with 0.30% SWNT cast on to a glass slide according to one embodiment of the present invention.
Figure 4:
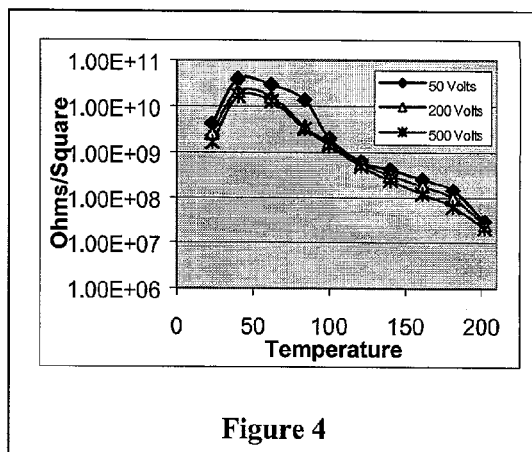
FIG. 4 depicts a plot of surface resistivity versus temperature data for Si-DETA-50-Ti with 0.20% SWNT cast on to a glass slide according to one embodiment of the present invention.
Figure 5:
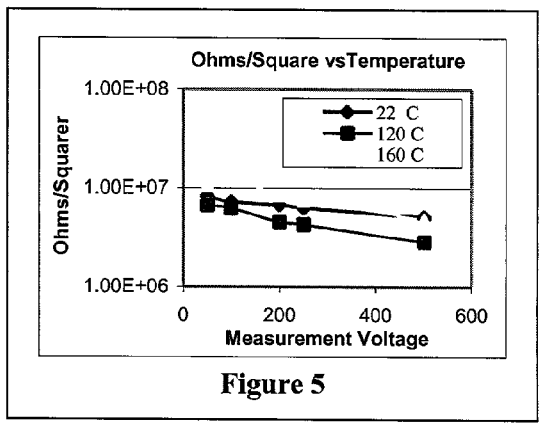
FIG. 5 depicts a plot of surface resistivity versus test voltage data for Si-DETA-50-Ti with 0.3% SWNT cast on to a glass slide according to one embodiment of the present invention.

Referring to FIG. 3, surface resistivity data for Si-DETA-50-Ti with 0.3% SWNT cast on to a glass slide is shown. The test period was over eight days with long soak times at each temperature. Very little hysteresis was observed, from starting values, when the sample was removed from the apparatus and returned to room temperature several times during the test. Note that the sample turned dark brown and cracked once the temperature exceeded 300° C. It is also interesting to note that even though the sample looked destroyed after testing it still have nearly the same resistivity as prior to testing. This test was repeated using a sample with lower loading of SWNT (0.2%) cast form the same batch of ceromer resin, see FIG. 4. The dependence on test voltage is also depicted. The ASTM test voltage is 500V, preferred. Actual static charge is much higher, up to 20,000V. Apparently, the ceromer ESD coating has reduced resistivity with increasing voltage. The peak at 50 to 100° C. may be due to moisture. The present inventors have noted reduced magnitude during second cycle of testing the same specimen. The voltage dependence is shown in detail in FIG. 5.

Based on the foregoing, it is projected that the surface resistivity of the nanotubes will remain constant after exposure to temperatures exceeding 800° C., and at temperatures exceeding 1000° C. Thus, the coating provides substantially the same ESD protection even after high temperature exposure.

Figure 6:
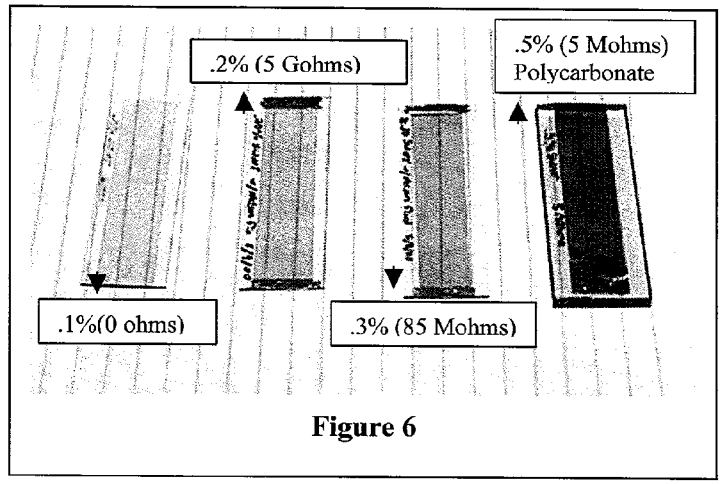
FIG. 6 depicts the percent nanotubes cast on glass slides labeled with resistance measurements according to one embodiment of the present invention.
Figure 7:
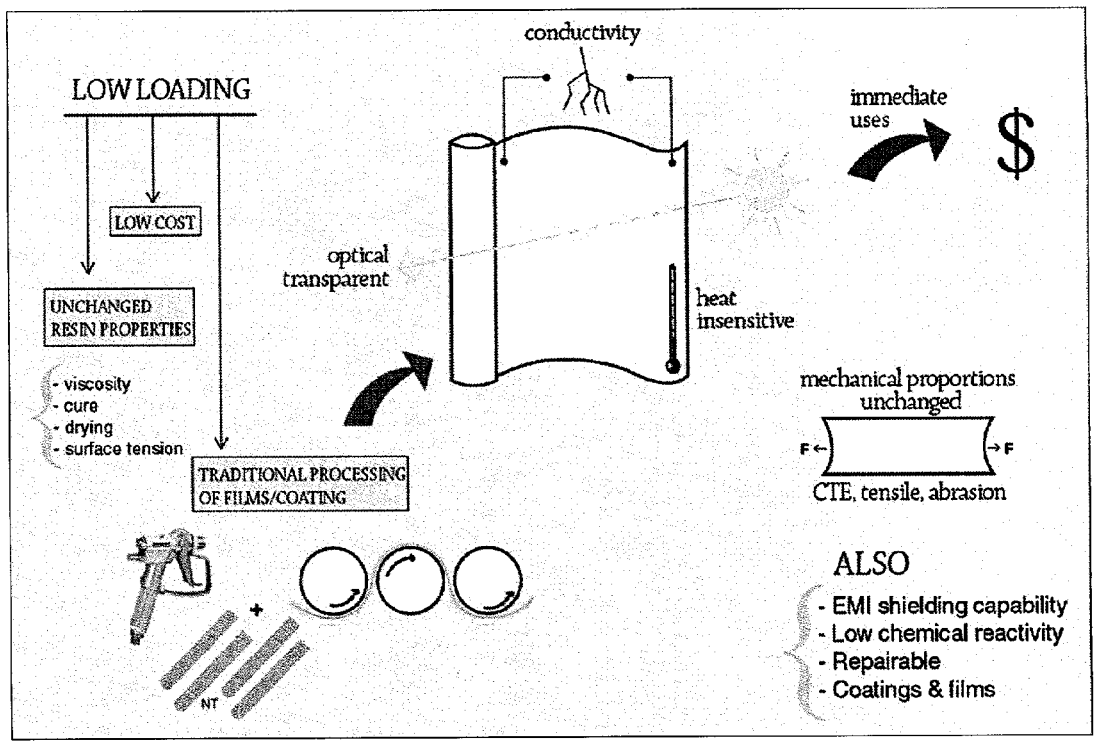
FIG. 7 depicts advantages of SWNTs used to impart electrical properties to films.

FIG. 6 shows the percent nanotubes cast on glass slides labeled with resistance measurements.

ESD Coatings

Electrical conductivity to a resin system without adversely affecting the other physical properties is demonstrated. This data presented in this section was obtained using three polyimides; POLYIMIDE-1 (CP-1 from SRS), POLYIMIDE-2 (CP-2 from SRS), and TPO (triphenyl phosphine oxide polymer from Triton Systems, Inc.). Similar results to those presented below, have been collected on other resins and are expected from most other polymer resins useful for film forming and coatings applications.

Summary of Results

Electrical conductivity has been imparted to a resin system without adversely affecting other physical properties. Data presented in this section demonstrate three polyimides; POLYIMIDE-1, POLYIMIDE-2, and TPO. Similar results to those presented below, have been collected on other resins and are expected from most other polymer resins useful for film forming and coatings applications.

Successful incorporation of SWNTs into ESD films and coatings are listed here with a brief summary of some of the results obtained:

A) Electrical resistivity; concentration, and thickness of nanotube filled films. Resistivity easily adjusted from $10^2$ to $10^{12}$ at any thickness greater than 1 micron. Resistivity through bulk or surface of films demonstrated with very high optical clarity and low haze.

B) Thermal effect on conductivity. Resistivity insensitive to temperature and humidity from at least −78 to +300° C. Resistivity lowers with increasing voltage. Resistivity insensitive to temperature cycling and soak.

C) Optical transparency of SWNT filled matrix for window and lens applications. Transmission loss of only 10–15% for 25 micron thick films with bulk conductivity. Transmission loss of only 1–5% for thinner 2–10 micron conductive films. Haze values typically <1%. Mechanical property changes to the resin and final films due to presence of nanotubes. Tensile, modulus, and elongation to break unaffected by addition of nanotubes. Coefficient of thermal expansion unaffected by addition of nanotubes. No other qualitative differences between films with or without nanotubes observed.

D) Processing of resin and films unaffected by incorporation of nanotubes. Viscosity, surface tension, wetting, equivalent to unfilled resin. Casting, drying, curing, film parting, and final surface appearance identical. In special cases of high nanotube loading some viscosity increase is observed.

E) Formulation of the SWNT homogeneously throughout the matrix for uniform properties. Large area (2 ft. sq.) films have very uniform electrical characteristics. Processing used in phase I is scalable using continuous homogenizers and mixers. Some inclusions due in part to impurities in nanotubes still present a challenge.

Each of these key areas is presented in detail following a brief discussion on experimental plan.

The films and coatings used for testing form two classes. The first class of films are those made for comparative properties testing between POLYIMIDE-1, POLYIMIDE-2, and TPO films with and without nanotubes. In this matrix of films samples, all preparation conditions, procedures, and materials where identical for the films made with or without nanotubes. A uniform final film thickness of 25 microns was also maintained. The loading concentration of SWNTs was determined from preliminary test films created with nanotube filling weight percentage between 0.03 to 0.30%. From this test, the films were standardized to 0.1% to give films with resistivity between $10^5$–$10^9$ Ohms/sq. During the concentration test films with resistivity from 50 Ohms/sq to over $10^{12}$ Ohms/Sq were able to be made. Lastly, the film thickness was selected to be 1 mil (25 um) since current application make use of this thickness and based on observations that resistivity, at a set concentration of nanotubes, does not vary with thickness unless film is below 2 microns. This resulting set of specimens was used in a test matrix comparing: 1) electrical resistivity at various temperatures, 2) optical transmittance and haze, 3) mechanical properties of tensile, modulus, elongation, and 4) coefficient of thermal expansion (CTE). The preparation and results of testing the films in this matrix are presented as listed above.

The second class of films and coatings for testing were prepared by various means and represent special coatings and films which demonstrate the wide variety of properties attainable using this nanotechnology enhancement to these resins. For example, these samples include measurement of resistivity as a function of the film thickness and nanotube loading level. The methods used for preparation of these special demonstrations are presented.

Preparation and Test Results for Films in Comparative Matrix

The materials used were POLYIMIDE-1 and POLYIMIDE-2, and TPO. Both POLYIMIDE-1 and POLYIMIDE-2 were cast at a final concentration of 15% while TPO was cast at a final concentration of 20% in NMP. To prepare the resins for casting, each resin was placed in a three-neck round bottom flask with enough NMP to make more concentrated 20% solution for POLYIMIDE-1 and POLYIMIDE-2 and a 25% solution for TPO. This concentrate is later reduced by the addition of NMP and nanotubes. The resins were made in large batches, purged with nitrogen and stirred at 30 RPM for 18 hours. Each batch of resin was split in half and placed into two fresh flasks. Then two aliquots of NMP were placed in small jars for cutting the concentration of resin to casting viscosity. SWNTs were weighed out and added to pure NMP. The SWNTs and NMP were sonicated for 12 minutes. To one flask of resin concentrate, an aliquot of pure NMP was added to the concentrate while the other half of the resin solution an aliquot of NMP containing SWNTs was added. Both flasks were stirred at 30 RPM for half an hour, filtered and placed in jars for casting. Through the task of preparing the resins for casting, attention to stirring, mixing and other details were standardized to keep processing of the virgin and 0.1% SWNT resins the same.

The samples were cast onto ¼ inch thick glass panels that were cleaned with soap and water and then rinsed in pure water and allowed to dry. The glass was washed and with methanol and a lint free cloth. When the methanol dried the samples were cast two inches wide using a casting knife to make a final thickness of 1 mil final thickness. For POLYIMIDE-1 and POLYIMIDE-2 a 12.5 mil casting thickness was used while TPO required 10-mil casting to achieve 1 mil. The cast samples were died at 130° C. overnight and then at 130° C. under vacuum for an hour. The thin samples prepared for optical testing were not removed from the glass but dried and heated like all the other coatings. The films were then floated off the glass by using purified water, to reduce water spots. After drying, the samples were tested for residual solvents using a TGA. The remaining solvent was about 10, which was too high. The samples were then taped on the glass panels using Kapton tape and heated to 130° C. under vacuum for 18 hours. Using the TGA again to check for solvent content it was found that the coatings were reduced to about 3–6% solvent. The samples were placed back into the oven and heated to 160° C. under vacuum for 18 hours. After this heating process the solvent levels were below 2% and used for testing.

The following test results were obtained: 1) electrical resistivity at various temperatures; 2) optical transmittance and haze; 3) mechanical properties of tensile, modulus, elongation; and 4) coefficient of thermal expansion (CTE).

Resistivity in Comparative Matrix as a Function of Temperature, Voltage, and Humidity.

Background:

To impart the conductive path throughout a structure, a three-dimensional network of filler particles was required. This is referred to as percolation threshold and is characterized by a large change in the electrical resistance. Essentially, the theory is based on the agglomeration of particles, and particle-to-particle interactions resulting in a transition from isolated domains to those forming a continuous pathway through the material. Nanotubes have a much lower percolation threshold than typical fillers due to their high aspect ratio of >1000 and high conductivity. As and example, the calculated percolation threshold for carbon black is 3–4% while for typical carbon nanotubes the threshold is below 0.04% or two orders of magnitude lower. This threshold value is one of the lowest ever calculated and confirmed. (See J. Sandler, M. S. P. Shaffer, T. Prasse, W. Bauhofer, A. H. Windle and K. Schulte, "Development of a dispersion process for catalytically grown carbon nanotubes in a epoxy matrix and the resulting electrical properties", University of Cambridge, United Kingdom, and the Technical University Hamburg-Hamburg, Germany).

The high conductivity imparted when NT's are dispersed in a polymer at low concentrations (0.05 to 2-wt. %) is not typically observed in a filled material. This is one of the most attractive aspects to using NT to make conductive materials. For a typical filled system, like polyaniline (PAN) particles in a polymer matrix, a 6 to 8% volume fraction is required to reach percolation threshold for conductivity. Even when PAN is solution blended the loading exceeds 2 wt. %. Another, more common example is found in ESD plastics used in the electronics industry were polymers are filled with carbon black to a loading of 10 to 30-wt. %.

The high conductivity at low concentration is due to the extraordinarily high aspect ration of SWNTs and the high tube conductivity. In fact, the electrical conductivity of individual tubes has been measured and determined to exhibit metallic behavior.

Electrical Resistivity and Thermal Stability.

Figure 8:
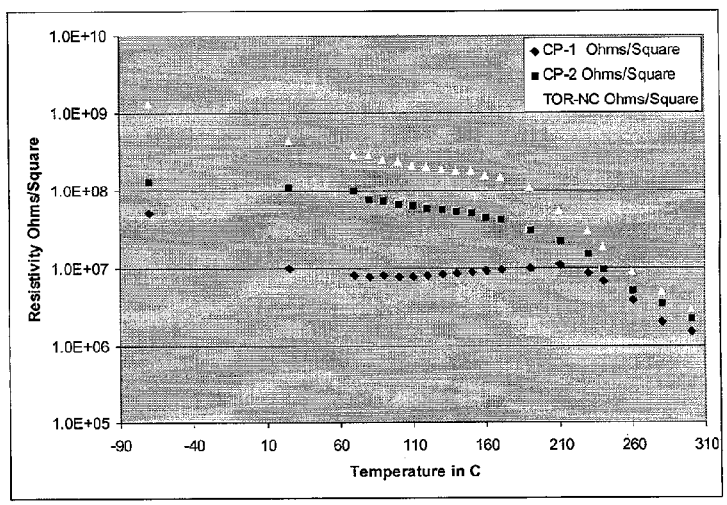
FIG. 8 depicts results showing how each of the three films resistivity (@500V) varied with temperature from −78 to +300° C.

To demonstrate the thermal stability through a wide range of temperatures we mounted samples from each film in the test matrix onto glass slides using Kapton tape. These slides were placed in an environmental test chamber with leads attached to silver-metal painted stripes on each of the three types, POLYIMIDE-1, POLYIMIDE-2, and TPO. The results showing how each of the three films resistivity varied with temperature from −78 to +300° C., are presented in FIG. 8.

The results indicate that electrical resistivity in all three films is insensitive to a wide range of temperatures. The relative value of resistivity between the films is not important since it can be adjusted easily by changing the concentration of the tubes.

However, in general TPO has a high resistivity at a given nanotube concentration in all the samples made in the phase I. This data also indicates that imparting conductivity to polymer by addition of SWNTs will produce a film with excellent thermal stability, at least as good as the base resins. These films were cycled through this test several times without any notable change in resistivity. In addition, we left then to soak for a period of 63 hours in air at 250° C. to observe the long-term stability as shown in Table 4 below:

TABLE 4

Resistivity (Ohms/sq.) vs. Time

| Hours at 250 C. | POLYIMIDE-1 | POLYIMIDE-2 | TPO |
| --- | --- | --- | --- |
| 0 | 3.0E+6 | 5.4E+6 | 6.3E+6 |
| 63 | 4.4E+6 | 6.1E+6 | 7.8E+6 |

Figure 9:
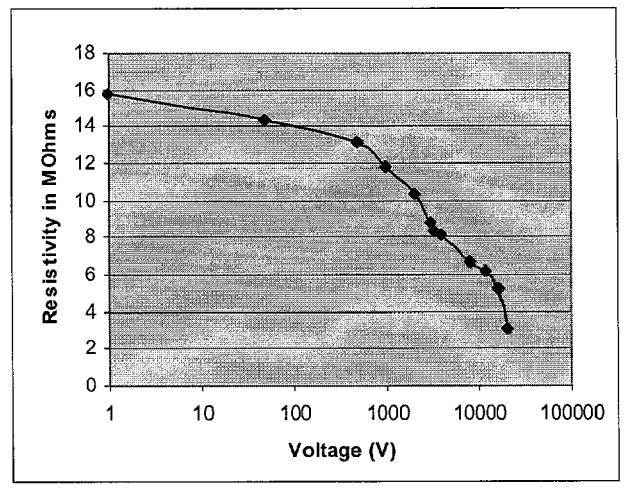
FIG. 9 depicts resistivity in Ohms/Sq. for 1 mil POLY-IMIDE-1 film as voltage is reduced.

Also of interest was the relationship between test voltage and measure resistivity. The resistivity was calculated by holding the test voltage constant and recording the current across the sample using ohms law. POLYIMIDE-1 coated on glass with 0.1% SWNTs was tested from 1 Volt to 20 KV, with the calculated resistivity, normalized to Ohms/sq, plotted in FIG. 9. This graph shows that the resistance of these films reduces with increasing voltage. This is also observed at elevated temperatures. From a design stand point, this meant those films tested using low voltage meters is adequate, since the resistance was only going to reduce is the film is subject to higher voltage in the application. In fact these carbon nanocomposite films may be developed for lightening protection.

To test thermal stability, samples of each of the six films in the test matrix were scanned by TGA and DSC to evaluate how they behave with and without nanotube present. The percent weight loss at 350° C. and the glass transition temperature was recorded. See the Tables 6 and 7 below for results:

TABLE 6

TGA Data on POLYIMIDE-1, POLYIMIDE-2 and TPO films with and with nanotubes

| Sample Description | % Weight loss @ 350° C. |
|---|---|
| Virgin POLYIMIDE-1 | 1.57 |
| POLYIMIDE-1 w/SWnT | 1.46 |
| Virgin POLYIMIDE-2 | 3.50 |
| POLYIMIDE-2 w/SWnT | 4.57 |
| Virgin TPO | 3.64 |
| TPO w/SWnT | 4.65 |

TABLE 7

DSC Data on POLYIMIDE-1, POLYIMIDE-2, TPO Films

| Sample Description | Glass Transition Temperature $T_g$ (° C.) | Reported $T_g$ (° C.) |
|---|---|---|
| POLYIMIDE-1 Virgin | 248.3 | 263 |
| POLYIMIDE-1 w/SWnT | 249.7 | |
| POLYIMIDE-2 Virgin | 163.8 | 209 |
| POLYIMIDE-2 w/SWnT | 162.4 | |
| TPO Virgin | 172.4 | N/A |
| TPO w/SWnT | 186.8 | |

The decrease in the TGA and $T_g$ of the films is a result of residual NMP trapped in the film. The TPO resin did not give a clean or good DSC curve until thermally cycled a couple times.

Summary of Electrical Test Results.

Films have electrical resistivity much lower than required for ESD applications and can be easily designed for any level of electrical resistance above a 100 Ohms/sq. using very low loading level of nanotubes. Electrical properties are insensitive to temperature, humidity, ageing. The presence of the nanotube does not harm the other thermal properties of the films.

Optical Transmittance and Haze.

SWNTs are excellent additives to impart conductivity to polymeric systems and consequently function well in an ESD role. However, for application to optics and windows, the resulting films or coatings must also be transparent. Samples of each film made for the comparative test matrix were tested using ASTM D1003 "Standard Test Method for Haze and Luminous Transmittance of Transparent Plastics" This test method covers the evaluation of specific light-transmitting and wide-angle-light-scattering properties of planar sections of materials such as essentially transparent plastic. A procedure is provided for the measurement of luminous transmittance and haze. We also tested thinner films made from the same resin batch. This data is presented in the Table 8 below. For comparison, the same films were tested for % T at fixed frequency of 500 nm using a Beckman UV-Vis spectrometry on both glass, see Table 9, and as free standing films, see Table 10.

TABLE 8

ASTM D1003-00B, optical haze, luminous and diffuse transmittance data for films with and without nanotubes. Note all thee films are conductive in the ESD range

| Sample Identification | Thickness Microns | Ohms per Square | Haze % | Total Luminous Trans % | Diffuse Trans % |
|---|---|---|---|---|---|
| Test Matrix Films, Free Standing | | | | | |
| POLYIMIDE-2 Virgin film | 27 | >1.0 × $10^{12}$ | 1.4 | 88.9 | 1.6 |
| POLYIMIDE-2 With 0.1% SWnT film | 27 | 1.6 × $10^6$ | 3.1 | 62.7 | 5.0 |
| TPO Virgin film | 30 | >1.0 × $10^{12}$ | 1.5 | 86.8 | 1.7 |
| TPO With SWnT film | 30 | 5.0 × $10^8$ | 1.0 | 70.7 | 1.4 |
| POLYIMIDE-1 Virgin film | 25 | >1.0 × $10^{12}$ | 0.7 | 90.2 | 0.8 |
| POLYIMIDE-1 With SWnT film | 25 | 1.4 × $10^7$ | 1.1 | 64.8 | 1.7 |
| Thin Films/Coatings on Glass | | | | | |
| Blank | NA | NA | 0.3 | 88.5 | NA |
| POLYIMIDE-1 Virgin | 4 | >1.0 × $10^{12}$ | 0.1 | 99.2 | 0.1 |
| POLYIMIDE-1 With 0.1% SWnT | 4 | 3.0 × $10^8$ | 0.3 | 93.6 | 0.3 |
| POLYIMIDE-1 Virgin | 12 | >1.0 × $10^{12}$ | 0.3 | 99.0 | 0.3 |
| POLYIMIDE-1 With 0.1% SWnT | 12 | 1.9 × $10^7$ | 0.4 | 85.0 | 0.4 |

POLYIMIDE-1 was cast onto glass substrates with and without SWNTs at 2 and 6 mils thick. An additional ultrathin sample was prepared using POLYIMIDE-1 compounded with 0.3% SWNTs and cast at 0.5 mil thick. These samples were tested on the UV-Vis spectrometer for percent transmission at 500 nm, an industry standard for comparison. The glass was subtracted out of each sample. Table 9 presents the optical and resistivity data for these samples cast on glass. The same tests were run on POLYIMIDE-2 and TPO, with very similar results.

TABLE 9

POLYIMIDE-1 on glass

| Sample Description | % T @ 500 nm | Resistivity in Ohms/Sq. |
|---|---|---|
| POLYIMIDE-1 with 0.1% SWnT at 4 um | 77.3 | 3.0E+8 |
| POLYIMIDE-1 with 0.1% SWnT at 12 um | 75.2 | 1.9E+7 |
| Virgin POLYIMIDE-1 at 4 um | 83.7 | >$10^{13}$ |
| Virgin POLYIMIDE-1 at 12 um | 89.2 | >$10^{13}$ |

Another set of samples were cast at the same thickness and removed from the glass. The freestanding films were also analyzed using the UV-Vis at 500 nm. Table 10 represents the results of the freestanding films.

TABLE 10

Freestanding POLYIMIDE-1

| Sample Description | % T @ 500 nm | Resistivity in Ohms/Sq. |
|---|---|---|
| POLYIMIDE-1 with 0.1% SWnT at 4 um | 77.3 | 3.0E+8 |
| POLYIMIDE-1 with 0.1% SWnT at 12 um | 75.2 | 1.9E+7 |
| Virgin POLYIMIDE-1 at 4 um | 83.7 | >$10^{13}$ |
| Virgin POLYIMIDE-1 at 12 um | 89.2 | >$10^{13}$ |

Summary of Optical Test Results.

The optical testing of these ESD films in the test matrix demonstrates excellent transmission with low loss. Even more exciting are the results of thin film and bi-layer experiments where optical properties were the focus and result in near colorless (>95% T) films and coatings. With successful demonstration of optically clear, low resistivity films, the next step was to confirm that these films have the same or better mechanical properties as those not enhance with nanotubes.

Mechanical Properties of Tensile, Modulus, Elongation.

Figure 10:
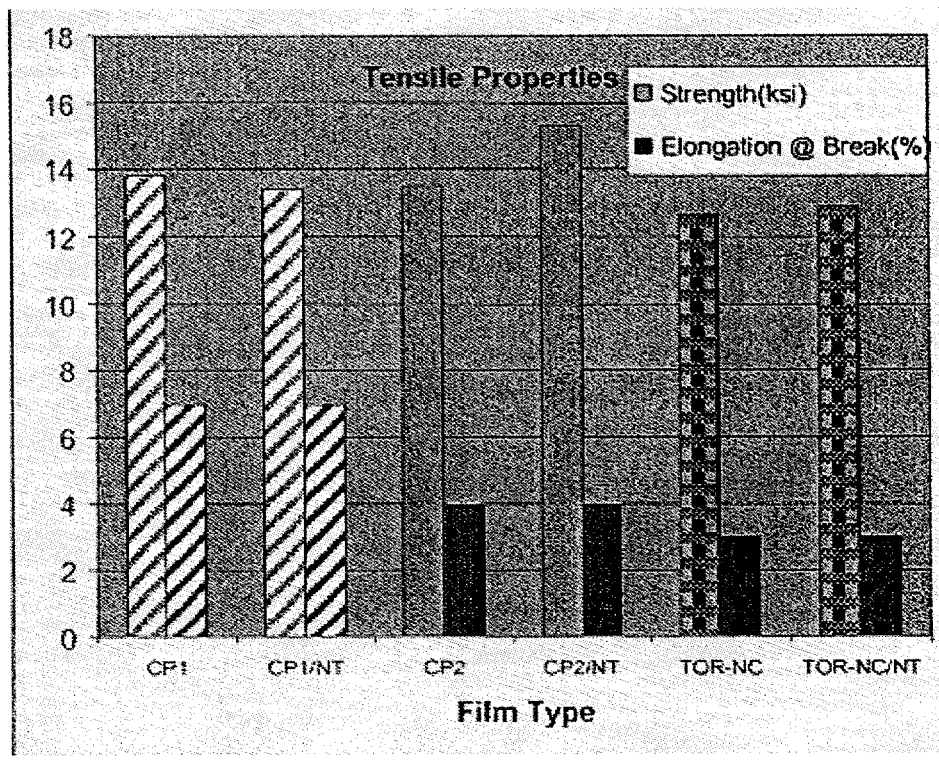
FIG. 10 depicts tensile properties for POLYIMIDE-1, POLYIMIDE-2, and TPO resins with and without nanotubes.

The use of these films inmost application requires good mechanical properties. In this section, it is demonstrated that the presence of nanotube to impart the ESD characteristic does not adversely affect the mechanical properties of these polymer films. To that end, each type of film with and with out nanotube present was tested for tensile strength, tensile modulus, and elongation at break. The results of these tests are in Table 11 and graphed in FIG. 10.

Coefficient of Thermal Expansion (CTE).

SWNTs' ability to impart ESD characteristics does not adversely affect the coefficient of thermal expansion (CTE) properties of polymer films. To that end, each type of film with and with out nanotube present was tested. The CTE tests were conducted using Universal Testing Machine from SRS. The testing was conducted on 6 samples of film: Virgin POLYIMIDE-1, POLYIMIDE-1 with SWNT, Virgin POLYIMIDE-2, POLYIMIDE-2 with SWNT, Virgin TPO, and TPO with SWNT.

Each sample was first mounted onto a strip of 5 mil Kapton since the samples alone were slightly too short to be placed on the fixtures properly. Once the sample was fixed to the machine, the strain gage clamps were placed onto the film using a standard 4" gage length. The film was then loaded with approximately 15 grams, which would provide a suitable stress to initiate elongation during heating but not permanent deformation.

Figure 11:
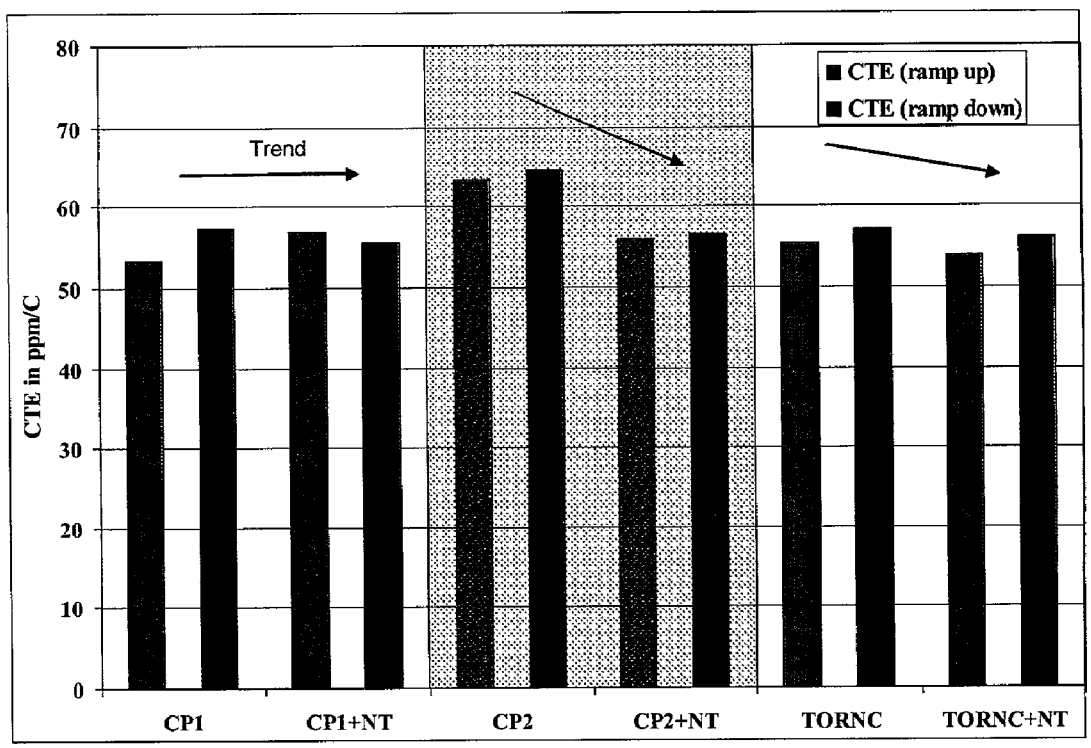
FIG. 11 depicts CTE Data on POLYIMIDE-1, POLYIMIDE-2, and TPO 1 mil films with and without 0.1% SWnTs.

The POLYIMIDE-1 and POLYIMIDE-2 samples behaved as expected throughout the temperature range. The TPO samples behaved irregularly as compared to the polyimide. Initially, the samples appeared to shrink when heat was first applied then would grow normally as the temperature increased. The behavior seemed typical for the TPO VIR trial 1 on the ramp upward once the film normalized. Interestingly, the TPO material followed a different profile on the temperature ramp down and actually decreased in size before growing back to its original size. Another interesting behavior is that the TPO material seemed to change size if left to soak at 177 C (350° F.) for any length of time. The virgin TPO shrank when soaked at 177° C. while the TPO with SWNTs grew when soaked at 177° C. Since the behavior was the same for both trials, it was determined that neither operator error nor instrument error was at fault. All CTE measurements fell within 10% of known values and are presented in Table 11 and in FIG. 11.

TABLE 11

The CTE values for each material

| Material | CTE (ramp up) | CTE (ramp down) |
|---|---|---|
| POLYIMIDE-1 | 53.27 ppm/C | 57.18 ppm/C |
| POLYIMIDE-1 with SWnT | 56.87 ppm/C | 55.58 ppm/C |
| POLYIMIDE-2 | 63.38 ppm/C | 64.45 ppm/C |
| POLYIMIDE-2 with SWnT | 56.00 ppm/C | 56.43 ppm/C |
| TPO (trial1) | 55.42 ppm/C | 57.04 ppm/C |
| TPO with SWnT (trial1) | 53.81 ppm/C | 56.13 ppm/C |
| TPO (trial2) | 50.70 ppm/C | 57.60 ppm/C |
| TPO with SWnT (trial2) | 60.86 ppm/C | 55.78 ppm/C |

Summary of CTE Testing

As with the tensile properties, the CTE properties of these films were generally unchanged by the addition of nanotubes. This will permit the use of these other polymers enhanced by the addition of nanotubes for coating and multilayer applications were CTE matching is important for bonding and temperature cycling.

Results Obtained from Exploratory Films and Coatings.

In this section are provided those results obtained from films and coating made from the same three resins, however, in these samples film thickness and nanotube concentration were not held fix. Samples were generated to demonstrate the ease at which very high clarity, high conductivity coatings and films can be produced using Nano ESD technology. In brief, the following samples were prepared and presented in the subsequent subsections of the proposal:

High clarity 1–2 micron thick coatings on glass with high loading levels of (0.2 and 0.3%) nanotubes.

Bilayer films, where very thin, high nanotube loading level is layered on standard thickness films.

Special polymer wrapped SWNT layered on 1 mil films.

High Clarity ESD Films

Figure 12:
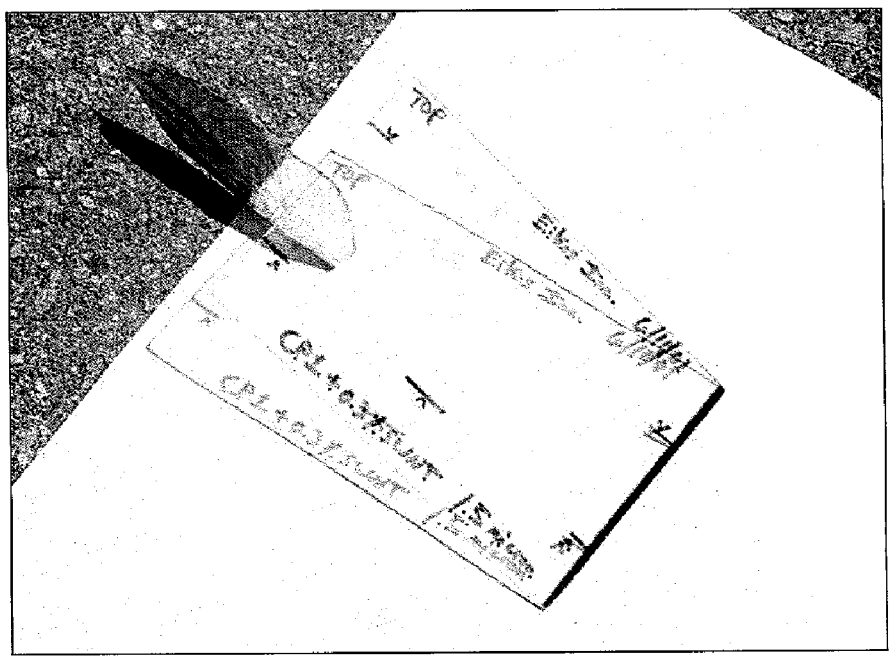
FIG. 12 depicts a POLYIMIDE-1 coating with 0.3% SWNTs @ 1.5 μm thick, slide is tilted off the paper/pavement by piece of mica, and is illuminated by sunlight. Stats: 96% T, 0.6% Haze, resistivity $3 \times 10^8$ Ohms/sq.

It is possible to obtain a highly absorbing film by increasing the nanotube concentration. A 1.5% loading level of multiwalled nanotubes in polymer matrix is black and dull in appearance. In contrast, an 8-micron thick polymer coating loaded with 0.2% SWNTs is still conductive yet nearly colorless as depicted in FIG. 12. This coating was formed by casting a solution of POLYIMIDE-1 with 0.3% SWNTs@1.5 μm final thickness. It has a resistivity of $10^8$ Ohms sq with transparency 96% T with haze of 0.6%.

This excellent coating demonstrates that by manipulating the concentration and coating thickness excellent optical and electrical properties can be obtained in the same film. For comparison, the same sample was tested in our UV-Vis spectrometer at 500 nm. The glass complicates the results since the ESD layer acts as an antireflective coating to the glass and alters the reflective components contribution to the transmission result. Nevertheless, this coating demonstrates the potential for very high clarity ESD coatings.

TABLE 12

Transmission at 500 nm for thin 0.3% POLYIMIDE-1 coating on glass

| Sample Description | % T @ 500 nm w/glass subtracted | Resistivity in Ohms/Sq. |
| --- | --- | --- |
| Ultrathin monolayer of POLYIMIDE-1 with 0.3% SwnT 0.5 mil cast | 83.8 | 3E+8 |
| Blank piece of glass | 88.8 | >$10^{13}$ |

To reduce optical absorbance in nanocomposite conductive films the coating can be formed from a thin monolayer of high concentration nanotubes. Several other techniques have also been demonstrated to achieve the same high optical transparency while maintaining high electrical conductivity in the film. Two of the most successful rely on the same concept just shown, they are: 1) the use of bi-layers and 2) ultra thin polymer wrapped nanotubes.

Bi-layer and Special Ultra Thin ESD Films.

A natural extension of the thin coating method for high optical clarity coatings, is to form a bi-layer free standing film by cast the thin 1 μm layer first on glass and then over coating with the thicker, 25 um layer of virgin resin. The resulting film has a conductive surface without conductivity through the thickness. We made films from the TPO resin to demonstrate the concept. The specifications for this film are provided in Table 13.

Nanotube concentration was increased to almost 50% in the conductive layer. This was done by modifying the nanotubes with a coating of polyvinylpyrrolidone (PVP). This is also referred to as wrapping the nanotubes with a helical layer of polymer. To accomplish this, SWNTs were suspended in sodium dodecy sulfate and PVP. This solution was then incubated at 50° C. for 12 hours and then flocculated with IPA. The solution is centrifuged and washed in water three times and then suspended in water. The resulting nanotubes are water soluble and easily sprayed or cast onto any surface. This solution was spray coated onto virgin films to create a fine coating (<1 um thick) that has ESD properties and is very clear and colorless.

The resulting coating can be coated with a thin binder while still remaining conductive or coated with a thicker layer to make free standing films. Using this technique, coatings with a resistivity down to 100 Ohms were generated.

Although only a few exemplary embodiments of the present invention have been described in detail in this disclosure, those skilled in the art who review this disclosure will readily appreciate that many modifications are possible in the exemplary embodiments (such as variations in sizes, structures, shapes and proportions of the various elements, values of parameters, or use of materials) without materially departing from the novel teachings and advantages of the invention. Accordingly, all such modifications are intended to be included within the scope of the invention as defined in the appended claims.

Other substitutions, modifications, changes and omissions may be made in the design, operating conditions and arrangement of the preferred embodiments without departing from the spirit of the invention as expressed in the appended claims.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All references cited herein, including all U.S. and foreign patents and patent applications, all priority documents, all publications, and all citations to government and other information sources, are specifically and entirely hereby incorporated herein by reference. It is intended that the specification and examples be considered exemplary only, with the true scope and spirit of the invention indicated by the following claims.

As used herein and in the following claims, articles such as "the", "a" and "an" can connote the singular or plural.

The invention claimed is:

1. An electrically conductive film comprising:
    a plurality of carbon nanotubes with an outer diameter of less than 3.5 mm wherein said film has a light transmittance of at least 60% and a surface resistance of less than about $10^{10}$ ohms/square.

2. The film of claim 1, wherein said nanotubes have an outer diameter of about 0.5 to 3.5 nm.

3. The film of claim 1, wherein said nanotubes have an outer diameter of about 0.5 to about 1.5 nm.

4. The film of claim 1, wherein said nanotubes are selected from the group consisting of single-walled nanotubes (SWNTs), double-walled nanotubes (DWNTs), and mixtures thereof.

5. The film of claim 1, wherein said nanotubes are substantially single-walled nanotubes (SWNTs).

6. The film of claim 1, wherein said nanotubes are present in said film at about 0.001 to about 1% based on weight.

7. The film of claim 1, wherein said nanotubes are present in said film at about 0.05%.

8. The film of claim 1, wherein the surface resistance is between about $10^{10}$ ohms/square and about $10^{10}$ ohms/square.

9. The film of claim 1, wherein the surface resistance is about $10^2$–$10^{10}$ ohms/square.

10. The film of claim 1, wherein the surface resistance is about $10^6$–$10^{10}$ ohms/square.

11. The film of claim 1, wherein the surface resistance is less than about $10^3$ ohms/square.

12. The film of claim 1, wherein the film has a volume resistances in the range of about $10^{-2}$ ohms-cm to about $10^{10}$ ohms-cm.

13. The film of claim 1, further comprising a polymeric material.

14. The film of claim 1, wherein the film is in the form of a solid film, a foam, or a fluid.

15. The film of claim 1, further comprising a polymeric material, wherein the polymeric material comprises a material selected from the group consisting of thermoplastics, thermosetting polymers, elastomers, conducting polymers and combinations thereof.

16. The film of claim 1, further comprising a polymeric material, wherein the polymeric material comprises a material selected from the group consisting of polyethylene, polypropylene, polyvinyl chloride, styrenic, polyurethane, polyimide, polycarbonate, polyethylene terephthalate, cellulose, gelatin, chitin, polypeptides, polysaccharides, polynucleotides and mixtures thereof.

17. The film of claim 1, further comprising a polymeric material, wherein the polymeric material comprises a material selected from the group consisting of ceramic hybrid polymers, phosphine oxides and chalcogenides.

18. The film of claim 1, further comprising a polymeric material wherein the nanotubes are dispersed substantially homogenously throughout the polymeric material.

19. The film of claim 1, further comprising a polymeric material wherein the nanotubes are present in a gradient fashion.

20. The film of claim 1, further comprising a polymeric material wherein the nanotubes are present on a surface of said polymeric material.

21. The film of claim 1, further comprising a polymeric material wherein the nanotubes are formed in an internal layer of said polymeric material.

22. The film of claim 1, further comprising an opaque substrate, wherein the nanotubes are present on a surface of said opaque substrate.

23. The film of claim 1, further comprising an additive selected from the group consisting of a dispersing agent, a binder, a cross-linking agent, a stabilizer agent, a coloring agent, a UV absorbent agent, and a charge adjusting agent.

24. The film of claim 1, wherein said film has a total light transmittance of about 70% or more.

25. The film of claim 1, wherein said film has a total light transmittance of about 80% or more.

26. The film of claim 1, wherein said film has a total light transmittance of about 90% or more.

27. The film of claim 1, wherein said film has a total light transmittance of about 95% or more.

28. The film of claim 1, wherein said film has a haze value less than 0.5%.

29. The film of claim 1, wherein said film has a haze value less than 0.1%.

30. The film of claim 1, wherein said film has a thickness between about 0.5 nm to about 1000 microns.

31. The film of claim 1, wherein said film has a thickness between about 0.05 to about 500 microns.

32. The film of claim 1, wherein the film has a haze value of less than 2%.

33. The film of claim 1, wherein the nanotubes are oriented in the plane of the film.

34. The film of claim 1, further comprising an additional layer of oriented nanotubes.

35. The film of claim 1, wherein the carbon nanotubes provide a surface resistance to said film in the range of about $10^0$–$10^{10}$ ohms/square.

36. The film of claim 1, wherein the carbon nanotubes provide a surface resistance to said film in the range of about $10^0$ to $10^4$ ohms/square.

37. The film of claim 1, wherein the carbon nanotubes provide a surface resistance to said film in the range of about $10^1$ to $10^2$ ohms/square.

38. The film of claim 1, wherein the carbon nanotubes provide a volume resistance to said film in the range of about $10^{-6}$ ohms-cm to about $10^6$ ohms-cm.

39. The film of claim 1, wherein the carbon nanotubes provide a volume resistance to said film in the range of $10^{-4}$ ohms-cm to $10^4$ ohms-cm.

40. The film of claim 1, wherein the carbon nanotubes provide a volume resistance to said film in the range of $10^{-2}$ ohms-cm to $10^2$ ohms-cm.

41. The film of claim 1, wherein the carbon nanotubes comprise substantially single-walled or double-walled carbon nanotubes, the light transmittance is at least 80%, and said carbon nanotubes provide a surface resistance to said film of $10^4$ ohms/square or less.

42. The film of claim 41, wherein the surface resistance of said film is $10^2$ ohms/square or less.

43. The film of claim 41, wherein the surface resistance of said film is $10^1$ ohms/square or less.

44. The film of claim 41, wherein the surface resistance is $10^1$ ohms/square or less, the light transmittance is greater than 95% and the haze value is less that 0.05%.

45. The film of claim 1, wherein the plurality of carbon nanotubes are oriented by applying a shear force to unoriented carbon nanotubes when forming the film.

46. The film of claim 1, wherein the plurality of carbon nanotubes are oriented in a plane of said film.

47. The film of claim 1, wherein the plurality of carbon nanotubes are orthogonally oriented.

48. The film of claim 1, wherein the plurality of carbon nanotubes are disentangled from each other to a greater extend than unoriented carbon nanotubes.

49. A method for making the electrically conductive film of claim 1 comprising:
providing a plurality of nanotubes with an outer diameter of less than 3.5 nm; and
forming a film of said nanotubes on a surface of a substrate.

50. The method of claim 49, wherein the step of forming the film comprises a method selected from the group consisting of spray painting, dip coating, spin coating, knife coating, kiss coating, gravure coating, screen printing, ink jet printing, roll coating and pad printing.

51. The method of claim 49, wherein said nanotubes have an outer diameter of about 0.5 to 3.5 nm.

52. The method of claim 49, wherein said nanotubes are selected from the group consisting of single-walled nanotubes (SWNTs), double-walled nanotubes (DWNTs), and mixtures thereof.

53. The method of claim 49, wherein said nanotubes are substantially single-walled nanotubes (SWNTs).

54. The method of claim 49, wherein the film has a volume resistances in the range of about $10^{-6}$ ohms-cm to about $10^6$ ohms-cm.

55. The method of claim 49, further comprising orienting the nanotubes in the plane of said film.

56. The method of claim 49, further comprising applying a shear force to carbon nanotubes when forming the film to provide orientation to said carbon nanotubes.

57. The method of claim 56, wherein the shear force is selected from the group consisting of an extrusion technique, application of pressure, application of differential force, shearing treatment, elongation, pulling of extruded plaque, and combinations thereof.

58. The method of claim 56, wherein the orientation is in the plane of the film.

59. A dispersion of nanotubes comprising a plurality of carbon nanotubes with an outer diameter of less than 3.5 nm, wherein when applied to a surface as a film of carbon nanotubes, said film is electrically conductive and allows for a light transmittance of at least 60% through said film.

60. The dispersion of claim 59, wherein said nanotubes have an outer diameter of about 0.5 to 3.5 nm.

61. The dispersion of claim 59, wherein said nanotubes are selected from the group consisting of single-walled nanotubes (SWNTs), double-walled nanotubes (DWNTs), and mixtures thereof.

62. The dispersion of claim 59, wherein said nanotubes are substantially single-walled nanotubes (SWNTs).

63. The dispersion of claim 59, further comprising a polymeric material, wherein the polymeric material comprises a material selected from the group consisting of thermoplastics, thermosetting polymers, elastomers, conducting polymers and combinations thereof.

64. The dispersion of claim 59, further comprising a polymeric material, wherein the polymeric material comprises a material selected from the group consisting of ceramic hybrid polymers, and phosphine oxides chalcogenides.

65. The dispersion of claim 59, further comprising a plasticizer, softening agent, filler, reinforcing agent, processing aid, stabilizer, antioxidant, dispersing agent, binder, a cross-linking agent, a coloring agent, a UV absorbent agent, or a charge adjusting agent.

66. The dispersion of claim 59, further comprising conductive organic materials, inorganic materials, or combinations or mixtures thereof.

67. The dispersion of claim 66 wherein the conductive organic materials are selected from the group consisting of buckeyballs, carbon black, fullerenes, nanotubes with an outer diameter of greater than about 3.5 nm, and combinations and mixtures thereof.

68. The dispersion of claim 66 wherein the conductive inorganic materials are selected from the group consisting of aluminum, antimony, beryllium, cadmium, chromium, cobalt, copper, doped metal oxides, iron, gold, lead, manganese, magnesium, mercury, metal oxides, nickel, platinum, silver, steel, titanium, zinc, and combinations and mixtures thereof.

69. The dispersion of claim 59, further comprising a conductive material selected from the group consisting of tin-indium mixed oxide, antimony-tin mixed oxide, fluorine-doped tin oxide, aluminum-doped zinc oxide and combinations and mixtures thereof.

70. The dispersion of claim 59, further comprising conductors, fluids, gelatins, ionic compounds, semiconductors, solids, surfactants, or combinations or mixtures thereof.

71. The dispersion of claim 59, wherein the film has a surface resistance of less than $10^4$ ohms/square and the light transmittance is greater than 80%.

72. The dispersion of claim 71, wherein the surface resistance is $10^2$ ohms/square or less.

73. The dispersion of claim 63, wherein the film has a haze value of 1.1% or less.

74. The dispersion of claim 63, wherein the carbon nanotubes are oriented by applying a shear force to unoriented carbon nanotubes when forming the film.

75. The dispersion of claim 63, wherein the carbon nanotubes are oriented in a plane of said film.

76. The dispersion of claim 63, wherein the carbon nanotubes are orthogonally oriented.

77. The dispersion of claim 63, wherein the carbon nanotubes are disentangled from each other to a greater extent than unoriented carbon nanotubes.

78. An electrically conductive film comprising:
a plurality of substantially single-walled or double-walled carbon nanotubes wherein said film has a light transmittance of at least 60% and a haze value of 5.7% or less, and said carbon nanotubes provide a surface resistance to said film of $10^4$ ohms/square or less.

79. The film of claim 78, wherein the light transmittance is at least 80%.

80. The film of claim 78, wherein the light transmittance is at least 90%.

81. The film of claim 78, wherein the surface resistance is $10^2$ ohms/square or less.

82. The film of claim 78, which has a haze value of 3% or less.

83. The film of claim 78, wherein the light transmittance is at least 80% and said film has a haze value of 2% or less.

84. The film of claim 78, which has a haze value of 1% or less.

85. The film of claim 78, wherein the light transmittance is at least 95%, the surface resistance is $10^2$ ohms/square or less, and said film has a haze value of 0.5% or less.

86. The film of claim 78, wherein the carbon nanotubes are oriented by applying a shear force to unoriented carbon nanotubes.

87. The film of claim 78, wherein the carbon nanotubes are oriented in a plane of said film.

88. The film of claim 78, wherein the carbon nanotubes are orthogonally oriented.

89. The film of claim 78, wherein the carbon nanotubes are disentangled from each other to a greater extend than unoriented carbon nanotubes.

90. An electrically conductive film comprising:
a plurality of substantially single-walled, carbon nanotubes wherein said film has a light transmittance of at least 60% and said carbon nanotubes provide a volume resistance to said film of $10^4$ ohms-cm or less and said film has a haze value of 5.7% or less.

91. The film of claim 90, wherein the light transmittance is at least 80%.

92. The film of claim 90, wherein the light transmittance is at least 90%.

93. The film of claim 90, wherein the surface resistance is $10^3$ ohms/square or less.

94. The film of claim 90, wherein the haze value is 2% or less.

95. The film of claim 90, which has a haze value of 1% or less.

96. The film of claim 90, wherein said film has a thickness between about 0.05 to about 500 microns.

97. The film of claim 90, wherein the light transmittance is at least 90%, the haze value is 0.5% or less, and the volume resistance is $10^3$ ohms-cm or less, and said film has a thickness of between about 0.05 to about 500 microns.

98. The film of claim 90, wherein the plurality of substantially single-walled, carbon nanotubes are oriented by applying a shear force to unoriented carbon nanotubes.

99. The film of claim 90, wherein the plurality of substantially single-walled, carbon nanotubes are oriented in a plane of said film.

100. The film of claim 90, wherein the plurality of substantially single-walled, carbon nanotubes are orthogonally oriented.

101. The film of claim 90, wherein the plurality of substantially single-walled, carbon nanotubes are disentangled from each other to a greater extend than unoriented carbon nanotubes.

102. An electrically conductive film consisting essentially of a film of single-walled carbon nanotubes, wherein said film has a light transmittance of at least 60% and at least some of said single-walled carbon nanotubes are oriented.

103. The film of claim 102, which has a haze value of 3% or less.

104. The film of claim 102, which has a haze value of 0.5% or less.

105. The film of claim 102, wherein the carbon nanotubes provide a surface resistance to said film of between about $10^0$ to $10^4$ ohms/square.

106. The film of claim 102, wherein the carbon nanotubes provide a surface resistance to said film of between about $10^1$ to $10^3$ ohms/square.

107. The film of claim 102, wherein the at least some of said single-walled carbon nanotubes are oriented by applying a shear force to unoriented carbon nanotubes when forming the film.

* * * * *

UNITED STATES PATENT AND TRADEMARK OFFICE
CERTIFICATE OF CORRECTION

PATENT NO. : 7,060,241 B2
APPLICATION NO. : 10/105623
DATED : June 13, 2006
INVENTOR(S) : Paul J. Glatkowski It is certified that error appears in the above-identified patent and that said Letters Patent is hereby corrected as shown below:

Column 20, line 35, please delete "mm" and insert therein --nm--.

Column 20, line 53, please delete "$10^{0}$", first occurrence, and insert therein --$10^{-10}$--.

Signed and Sealed this

Third Day of October, 2006

JON W. DUDAS
*Director of the United States Patent and Trademark Office*

(12) EX PARTE REEXAMINATION CERTIFICATE (7010th)
United States Patent
Glatkowski

(10) Number: US 7,060,241 C1
(45) Certificate Issued: Aug. 18, 2009

(54) COATINGS COMPRISING CARBON NANOTUBES AND METHODS FOR FORMING SAME

(75) Inventor: Paul J. Glatkowski, Littleton, MA (US)

(73) Assignee: Eikos, Inc., Franklin, MA (US)

Reexamination Request:
No. 90/010,049, Nov. 7, 2007

Reexamination Certificate for:
Patent No.: 7,060,241
Issued: Jun. 13, 2006
Appl. No.: 10/105,623
Filed: Mar. 26, 2002

Certificate of Correction issued Oct. 3, 2006.

Related U.S. Application Data

(60) Provisional application No. 60/278,419, filed on Mar. 26, 2001, provisional application No. 60/311,810, filed on Aug. 14, 2001, provisional application No. 60/311,811, filed on Aug. 14, 2001, and provisional application No. 60/311,815, filed on Aug. 14, 2001.

(51) Int. Cl.
*D01F 9/12* (2006.01)

(52) U.S. Cl. ............... 423/447.1; 428/299.1; 428/298.1; 428/297.4

(58) Field of Classification Search .................. None
See application file for complete search history.

(56) References Cited

U.S. PATENT DOCUMENTS

| | | | | |
|---|---|---|---|---|
| 4,663,230 A | * | 5/1987 | Tennent | 428/367 |
| 5,165,909 A | * | 11/1992 | Tennent et al. | 423/447.3 |
| 5,171,560 A | * | 12/1992 | Tennent | 423/447.3 |
| 5,576,162 A | * | 11/1996 | Papadopoulos | 430/527 |
| 5,853,877 A | * | 12/1998 | Shibuta | 428/357 |
| 5,908,585 A | | 6/1999 | Shibuta | |
| 6,183,714 B1 | * | 2/2001 | Smalley et al. | 423/447.3 |
| 6,250,984 B1 | | 6/2001 | Jin et al. | |
| 6,299,812 B1 | | 10/2001 | Newman et al. | |
| 6,872,681 B2 | * | 3/2005 | Niu et al. | 502/101 |

OTHER PUBLICATIONS

Thess et al., "Crystalline Ropes of Metallic Carbon Nanotubes", Science, vol. 273, Jul. 26, 1996, pp. 483–487.*

Dekker, Cees, Carbon Nanotubes as Molecular Quantum Wires, Physics Today, American Institute of Physics, May 22, 1999, pp. 22–28.*

T.W. Ebbesen, et al. "Electrical Conductivity Of Individual Carbon Nanotubes". Nature. vol. 382. Jul. 4, 1996. pp. 54–56.

Noriaki Hamada, et al. "New One–Dimensional Conductors: Graphitic Microtubules". Physical Review Letters. vol. 68, No. 10. Mar. 9, 1992. pp. 1579–1581.

Teri Wang Odom, et al. "Atomic Structure and Electronic Properties of Single–Walled Carbon Nanotubes". Nature. vol. 391. Jan. 1, 1998. pp. 62–64.

* cited by examiner

*Primary Examiner*—Stephen J Stein

(57) ABSTRACT

An electrically conductive film is disclosed. According to one embodiment of the present invention, the film includes a plurality of single-walled nanotubes having a particular diameter. The disclosed film demonstrates excellent conductivity and transparency. Methods of preparing the film as well as methods of its use are also disclosed herein.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–107 is confirmed.

New claims 108–117 are added and determined to be patentable.

*108. An electrically conductive, transparent film comprising:*

*a plurality of ropes comprising substantially single-walled or double-walled carbon nanotubes that are oriented so as to provide the film a light transmittance of at least 85% with a haze value of less than 0.1%, and a surface resistance of less than about $10^4$ ohms/square, wherein:*

*the carbon nanotubes have an outer diameter of about 0.5 nm to less than 3.5 nm; and*

*the electrically conductive, transparent film is flexible.*

*109. The film of claim 108, wherein the light transmittance is greater than 90% and the surface resistance is about $10^2$ ohms/square or less.*

*110. The film of claim 109, wherein the light transmittance is greater than 95%.*

*111. The film of claim 109, wherein the light transmittance is greater than 99%.*

*112. The film of claim 108, wherein the surface resistance is less than about $10^3$ ohms/square.*

*113. The film of claim 109, wherein the surface resistance is from about $10^0$ to $10^2$ ohms/square.*

*114. The film of claim 109, wherein the surface resistance is from about $10^0$ to $10^1$ ohms/square.*

*115. The film of claim 109, wherein the surface resistance is less than about $10^0$ ohms/square.*

*116. An electrically conductive, transparent film comprising:*

*a plurality of ropes of substantially single-walled or doubled-walled carbon nanotubes that are oriented so as to provide the film a light transmittance of at least 95% with a haze value of less than 0.5%, and a surface resistance of from about $10^0$ to $10^2$ ohms/square, wherein:*

*the carbon nanotubes have an outer diameter of about 0.5 nm to less than 3.5 nm,*

*the electrically conductive, transparent film is flexible; and*

*the carbon nanotubes comprise less than 0.1% of the film by weight.*

*117. The film of claim 116, wherein the surface resistance is from about $10^0$ to $10^1$ ohms/square and the light transmittance is greater than 99%.*

\* \* \* \* \*